W. H. CLIFFORD.
COMBINED SPEED REDUCER AND SLIP CLUTCH.
APPLICATION FILED AUG. 21, 1919.
1,410,655.
Patented Mar. 28, 1922.
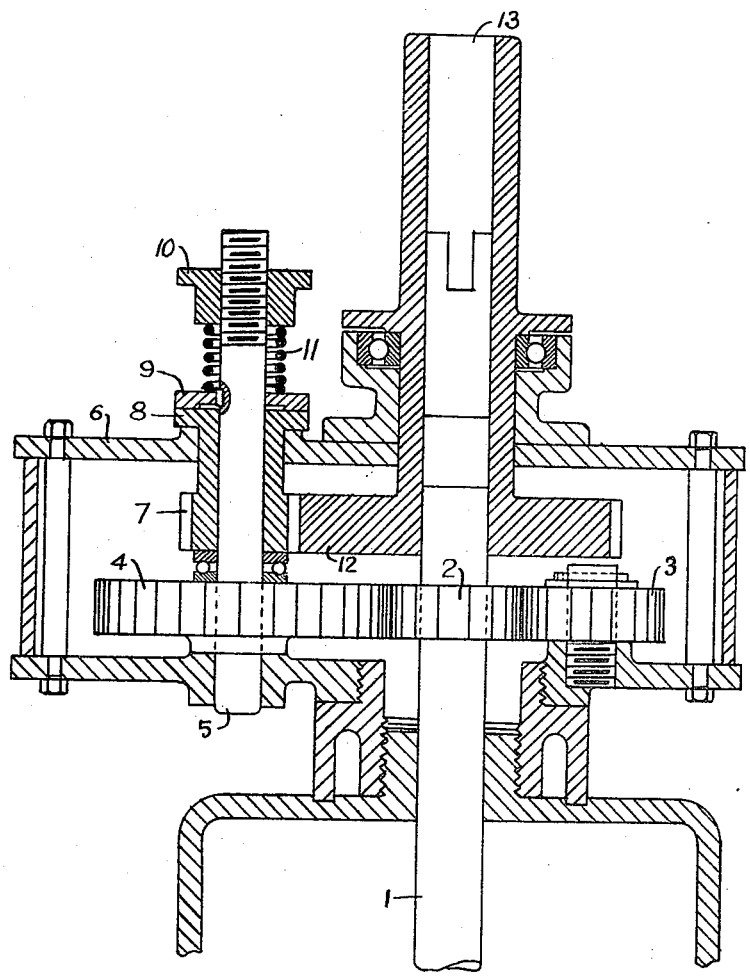
Inventor:-
William Hugh Clifford.
per Arthur J. Stephens
Attorney.

UNITED STATES PATENT OFFICE.

WILLIAM HUGH CLIFFORD, OF LONDON, ENGLAND.

COMBINED SPEED REDUCER AND SLIP CLUTCH.

1,410,655. Specification of Letters Patent. Patented Mar. 28, 1922.

Application filed August 21, 1919. Serial No. 318,973.

*To all whom it may concern:*

Be it known that I, WILLIAM HUGH CLIFFORD, a subject of the King of Great Britain and Ireland, residing at 67 Madeley Road, Ealing, London, W. 5, England, have invented an Improved Combined Speed Reducer and Slip Clutch, of which the following is a specification.

The present invention relates to speed reducing gear for high speed motors.

The invention combines a speed reducing gear with a slip clutch gearing by means of which the speed of a high speed motor can be reduced in any desired ratio with a minimum loss in power, space and weight—while the clutch will prevent any undue strains upon the gearing and will enable the speed of the driven shaft to be adjusted to the resistance of the load whenever this exceeds the normal. Means are provided for adjusting the grip of the clutch members to the desired load resilience on the driven shaft.

According to this invention the driving shaft is connected with the driven shaft through a combined pinion and clutch member mounted on a counter shaft and co-acting with a sliding clutch member adapted to adjustably grip said pinion clutch under the influence of a spring controlled by a nut. The object of this combination is to convert a small high speed motor into a low speed high power motor, thus producing the following advantages many of which have hitherto been unattainable:—

(*a*) A drive without the use of belting as the release now obtained is more rapid than the shifting of a belt from a fixed to an idle pulley.

(*b*) The motor is instantly liberated and secured from the evils of an overload that would otherwise be liable to cause fusion of the conducting wires of the motor.

(*c*) The slipping clutch can be so nicely adjusted that the machinery being driven will be thrown out of gear if the cutting resistance in for instance a lathe is increased by an extra cut of $\frac{1}{32}''$ or $\frac{1}{16}''$, thus guarding against constant breakage of tools.

My invention is illustrated by way of example in the accompanying drawing which shows a sectional view of the gearing.

Referring now to the drawing, the driving shaft 1 has keyed thereon a pinion 2 in gear with a gear wheel 4 to a counter-shaft 5 mounted in bearings in the gearing casing 6, parallel with the driving shaft. The said counter shaft has loosely mounted thereon a pinion 7 provided with a clutch face 8 adapted to be engaged by the clutch member 9 keyed to the said counter shaft. The pressure of the said member 9 against the face 8 of the pinion 7 is controlled by the nut 10 acting through the spring 11 tending to hold said clutch member against the face 8. It will be obvious that by increasing or reducing the pressure through the nut upon said spring the grip of the clutch can be adjusted as desired. The clutch pinion 7 is in gear with a gear wheel 12 keyed to or in one with sleeve 13 which forms the driven shaft of the gearing. This sleeve is preferably in line with the driving shaft and may receive the free end of said shaft 1 as shown. The ratios of the gear wheels are such that the counter shaft is driven at a reduced speed from the driving shaft 1 through the pinion 2 and the gear wheel 4 and the speed of the sleeve 13 forming the driven shaft is again reduced through the clutch pinion 7 and the gear wheel 12. By varying the ratios of these wheels any desired reduction of speed can be obtained. The yielding pressure of the slip clutch 7 prevents any undue strains upon the gearing and enables the speed of the driven shaft to be adjusted to the resistance of the load. As shown in the drawing I may employ if necessary an idle balance wheel 3.

What I claim is:—

A speed reducing gearing comprising a casing, a driving shaft mounted in bearings at one end of said casing, a hollow driven shaft in line with said driving shaft and adapted to receive and form a support for the free end of said driving shaft, a counter shaft, a gear wheel on said counter shaft, an idle balance wheel mounted in said casing on the opposite side of the driving shaft to said counter shaft, a driving pinion mounted on said driving shaft in gear with the wheel on said counter shaft and the idle balance wheel, a free pinion mounted on said counter-shaft in mesh with a gear wheel on said driven shaft, a friction face at one end of said free pinion, a friction clutch member slidingly fixed to the counter shaft, a spiral spring mounted on said counter shaft behind said sliding clutch member and a nut adapted to increase or reduce the tension on said spiral spring.

In testimony whereof I have signed my name to this specification.

CLIFFORD.